March 29, 1955 J. J. STONE, JR 2,705,108

ELECTRONIC ADDER-ACCUMULATOR

Filed Aug. 14, 1952 2 Sheets-Sheet 1

INVENTOR.
Joseph J. Stone, Jr.
BY
Roland A. Anderson
ATTORNEY

March 29, 1955 J. J. STONE, JR 2,705,108
ELECTRONIC ADDER-ACCUMULATOR
Filed Aug. 14, 1952 2 Sheets-Sheet 2

INVENTOR.
Joseph J. Stone, Jr.
BY
Roland A. Anderson
ATTORNEY

United States Patent Office 2,705,108

Patented Mar. 29, 1955

2,705,108

ELECTRONIC ADDER-ACCUMULATOR

Joseph J. Stone, Jr., Clinton, Tenn., assignor to the United States of America as represented by the United States Atomic Energy Commission Application August 14, 1952, Serial No. 304,255

7 Claims. (Cl. 235—61)

The present invention relates to digital computing machines, and more especially to a novel electrical adder-accumulator operating in parallel fashion on the digits of numbers to be added.

Since electronic circuits are particularly well-suited to store information in a binary system, many electronic computers utilize the binary number system throughout. But since most computer operators are accustomed to the decimal number system, some machines utilize decimal notation in part, and code the decimal numbers in a four binary digit code word for certain operations. One such code, the "excess-3" code, is shown in Table A, and is formed by adding 3 to the normal binary representation of a decimal digit.

*Table A*

| Decimal Number | Binary Code | Decimal Number | Binary Code |
|---|---|---|---|
| 0 | 0011 | 8 | 1011 |
| 1 | 0100 | 9 | 1100 |
| 2 | 0101 | 10 | 1101 |
| 3 | 0110 | 11 | 1110 |
| 4 | 0111 | 12 | 1111 |
| 5 | 1000 | 13 | 0000 |
| 6 | 1001 | 14 | 0001 |
| 7 | 1010 | 15 | 0010 |

Simultaneous addition in the illustrated system has not heretofore been practical, because it requires that a correction factor be added to the binary sum involved to form the correct result before decoding into the decimal system, yet this factor is not the same for all numbers added, so that a single correction factor added automatically to each sum would not suffice. Adders of the prior art are subject to many other disadvantages both from a theoretical and a practical standpoint. Serial-type adders are generally slow, since each digit of a long number must be added consecutively; a great many different voltage levels are required for the Kirchhoff-type adder where currents represent numbers and are summed by switching them through a resistor; and coincidence-type adders require exact timing of addend, augend, and carry pulses to obtain satisfactory operation. Such critical coincidence timing makes for poor reliability in operation, due to the changing characteristics of tubes and other circuit components.

These and other disadvantages of the arithmetic adders and accumulators of the prior art have been overcome in the present device, in which are provided a plurality of parallel adder groups—one for each decimal digit of the numbers to be added. Each unit is subdivided into four adder units—one for each digit of the coded binary representation of the decimal number. Each adder unit has associated therewith an accumulator in which is stored a number and a gate tube adapted to pass a pulse to change the accumulator total by 1 if, and only if a predetermined combination of input voltage levels, representing number and carry inputs, obtains. A control pulse is applied once during each add cycle to the gate tube, after the gate voltage reaches a steady-state value, so that no critical coincidence timing is involved.

The construction and operation of my adder-accumulator circuit will be readily understood from the following detailed description, when read together with the appended drawings, in which.

Figure 5:
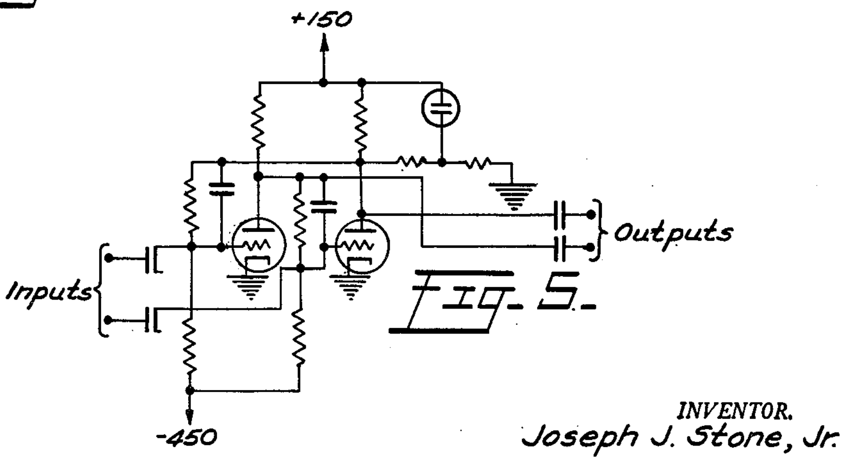
Fig. 5 shows a convenient storage device, the "flip-flop" circuit denoted "FF" in Fig. 1.

Referring first to Fig. 5, the Eccles-Jordan trigger pair shown may employ a 5687 twin-triode tube with plate load resistances of 2350 ohms and isolating diodes at the input and output. With a 150 volt B supply, the plate potential of the conducting half of the flip-flop will be about +70 volts, while the non-conducting plate is at +150 volts.

Figure 3:
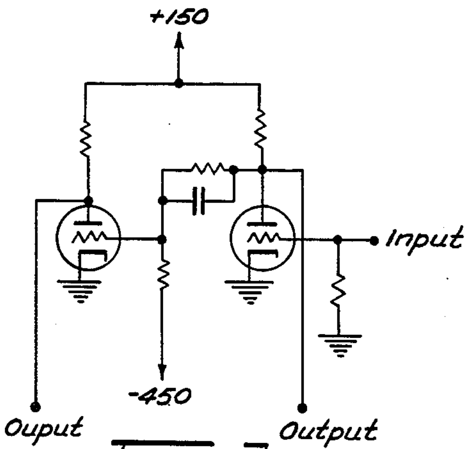
Fig. 3 is a schematic diagram of the "pair," referred to in the block diagram as "Pr."

The pair shown in Fig. 3 is a trigger pair or bi-stable device with one of the feedback networks from plate to grid removed, the input signals being applied to the grid lacking the feedback connection. In such arrangement, two output voltage levels are produced, dependent upon the level of the input: The non-conducting plate is at +450 volts, the other plate at about +70 volts. The tube may be type 5687.

Figure 4:
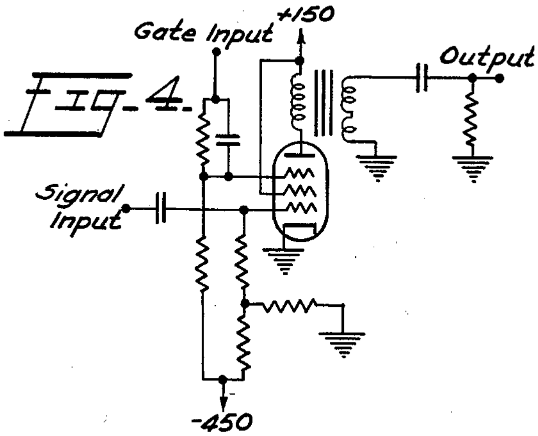
Fig. 4 shows a conventional gate tube, denoted "G" in Fig. 1.

The gate shown in Fig. 4 comprises a pentode tube such as type 6AS6 connected to receive an enabling, or gating pulse on the suppressor grid, and a signal pulse on the control grid. A negative pulse of about 10 volts applied to either grid will cut off the tube, so that the suppressor is kept at −15 volts normally. To "open" the gate, a single wide pulse is applied to the suppressor, raising it to the cathode potential. A very narrow signal pulse, less than 1 microsecond wide, is then applied to the control grid. The pulse at the anode is coupled through a transformer to the output.

Figure 1:
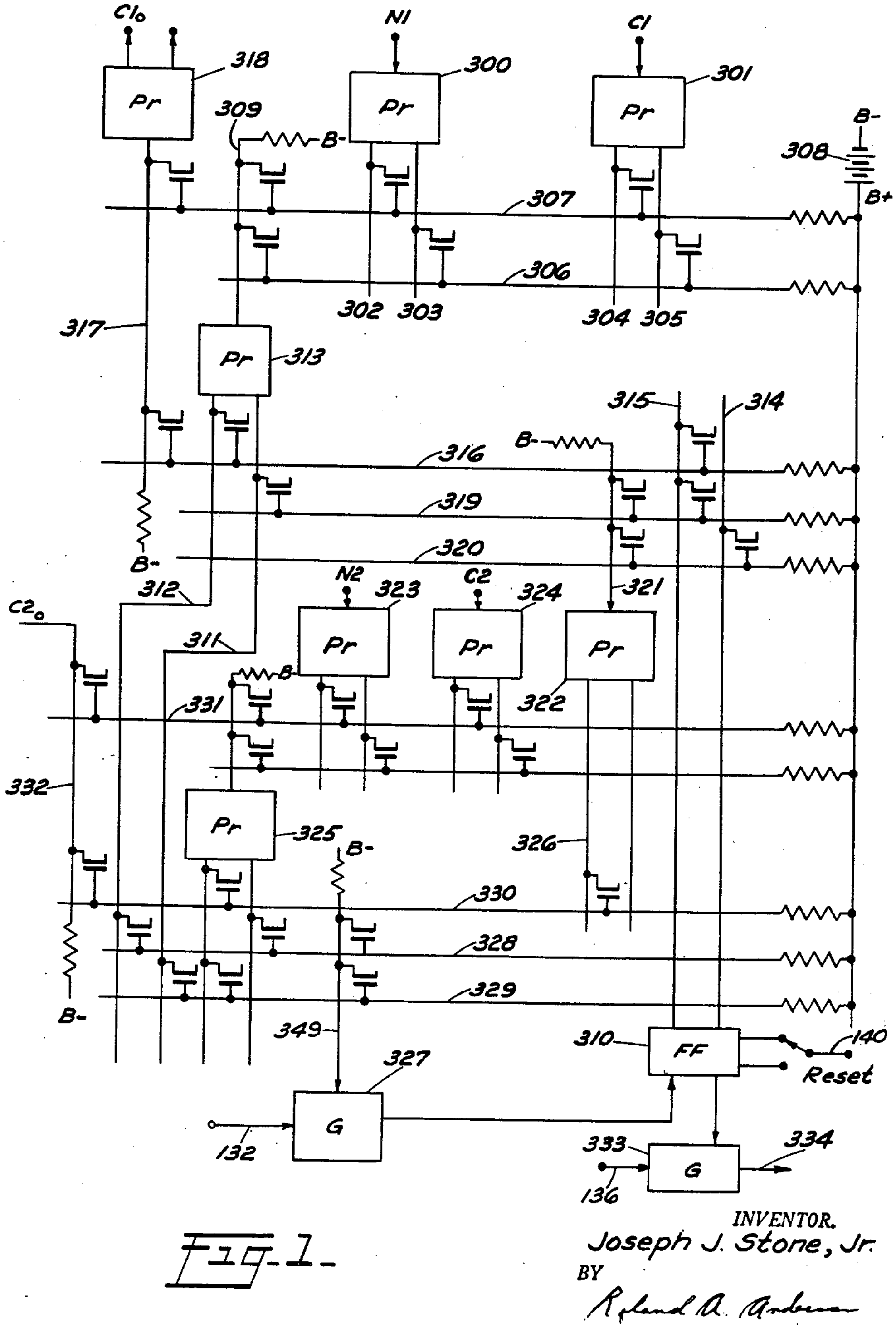
Fig. 1 illustrates in block form the basic circuit.

Referring now to the basic block diagram, Fig. 1, one of the two numbers to be added is stored as "1" or "0" in flip-flop 310 by actuation from reset line 140 to the proper input. The second number signal is represented by a voltage level, high for "1" and low for "0," on lead N1 into pair 300. A "carry" signal from a preceding stage is represented by the voltage level on lead C1, high for "carry," and low for "no carry." The correction factors which must be employed in the excess-3 coded decimal system, explained infra, are applied on leads N2, C2 into pairs 323, 324 as a number and a "carry" signal. The numbers and carries entering the adder determine the voltage levels of the pair outputs, which voltages are compared by diode matrices, interconnecting the pairs as shown, to determine the voltage applied to the suppressor grid of gate 327 through line 349.

Figure 2:
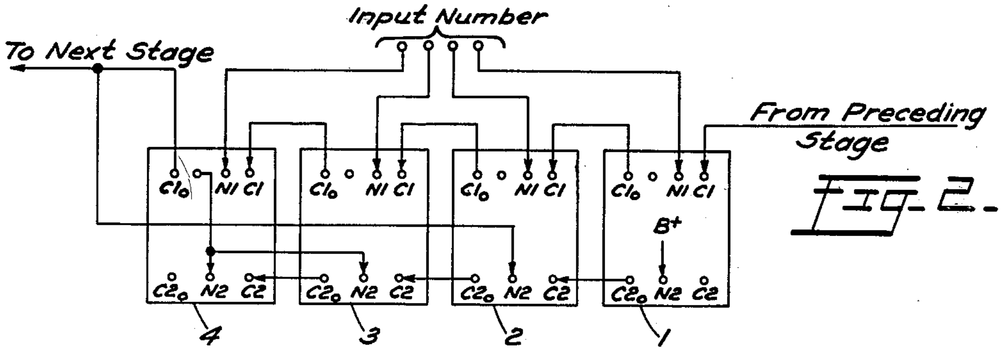
Fig. 2 illustrates four such circuit elements connected to form a decimal adder system.

Typical operation of a decimal adder formed from the basic unit shown in Fig. 1 is as follows:

1. The binary number signal N1, which is a high or low voltage level, enters amplifier pair 300 from an external source not shown. The carry signal C1, which is also a high or low voltage level, enters amplifier pair 301 from a preceding stage, as shown in Fig. 2.

2. The plate leads 302, 303, 304, 305, from the tubes of pairs 300, 301 are brought out to form a diode matrix, and the output voltages are compared through lines 306, 307, connected through separate resistors to the positive terminal of a source of potential 308. If leads 302, 304 are both "high," representing two "1's" at the inputs, line 307 is "high," representing "0" with "1" to carry. If leads 303, 305 are both "high," representing two "0's" at the input, line 306 is "high," also representing "0," with no carry. For either condition, it is evident that the number stored in the accumulator flip-flop 310 should not be changed.

3. Line 309 compares lines 306, 307, and is connected to the negative terminal of source 308 through a resistor. If either of the lines are "high," indicating "0," current flows through the appropriate diode and line 309, raising the potential of that line, indicating "no trigger" to pair 313; that is, flip-flop 310 is not to be triggered to its other stable state. If both lines 306, 307 are "low," representing inputs of "0" and "1," then line 309 will be "low," which is the "trigger" signal, indicating to pair 313 that flip-flop 310 should be triggered to its other state.

4. Line 309 governs the relative polarity of the plate leads 311, 312, of pair 313, the line 312 being "high" for the "trigger" or low input signal. The number stored in the accumulator circuit 310 determines the relative polarity of leads 314, 315, line 315 being "high" to represent a "1" stored in that device.

5. Line 316 compares lines 312, 315, and is "high" for the combination "trigger +1." Line 317 compares lines 316, 307, and is "high" for either "trigger +1" on line 316 or "1+1" on line 307, the signal going to pair 318 to deliver a "carry" pulse to the next stage through lead $C1_0$.

N2, the second number input, and C2, the second carry input, which in coded systems provide the correction factor of 3 mentioned hereinafter, are fed to pairs 323, 324 to set up a "trigger" or "no trigger" signal in the output of pair 325 in exactly the same manner as N1 and C1 did in the output of pair 313 in the circuit just described. Instead of only the one number located in the flip-flop 310, the sum of that number plus N2 plus C2 must be used in setting up the "carry" generated by this correction factor. Since a sum of one is used in setting up a "carry" it is only necessary to detect this condition, which may be done by means of lines 319 and 320. Line 319 is "high" if the flip-flop 310 contains a "1" and "no trigger" is indicated from pair 313. Line 320 is high if a "trigger" is indicated and the flip-flop 310 contains a "0." If either aline 319 or 320 is "high," then the diode connections to line 321 cause it to be "high" and the output line 326 of pair 322 will be "high," indicating a sum of "1." This pair output line may then be compared with the signal from pair 325 on line 330, which will be "high" for "trigger +1." Line 331, like line 307, will be "high" to indicate a "0" with "1" to carry. Line 332 compares lines 330, 331, and like similar line 317, will be "high" to indicate a carry to the next stage at output $C2_0$.

Two sets of trigger signals have been generated in the circuit. If either, but not both, circuits call for a trigger, then the add gate 327 should be opened, but, however, if both or neither call for a trigger, then the add gate should be closed, for two trigger inputs mean that the circuit should be triggered twice, which would return it to its initial state as if it had not been triggered. To select these two conditions, lines 328, 329, are diode connected to the outputs of pairs 313 and 325. Line 328 is "high" if a "trigger" is indicated from pair 313 but not pair 325, while line 329 is "high" if a "trigger" is indicated from pair 325 but not from pair 313. If either of these lines is "high," line 349 will be "high," opening the add gate 327 to the add pulse when it is received each add cycle from an external source, not shown, along lead 132.

To summarize the action described above, the voltage on the suppressor grid of the add gate 327 has been determined by the combination of four voltage inputs, each representing a binary number, in conjunction with the number internally stored in the flip-flop, in such a manner that the application of a single "add" pulse to the control grid of the gate will set the flip-flop in a position representing the sum of the five numbers. Such carries as are required are produced within the stage and coupled as a voltage level to the next stage to act as two of its inputs. The voltage at the gate reaches its steady state level before the application of the "add" pulse so that no coincidence is involved between pulses of short duration.

Auxiliary circuits may be provided to transfer out the sum held in storage flip-flop 310 of each adder in the groups, representing the four most significant digits of the sum. Pentode gates 333 are provided in the adders of those groups, and are open only when the flip-flop 310 contains a "1" by coupling one output of the flip-flop to the suppressor grid of the gate. A suitable external "transfer" pulse may be applied to the input of this gate on line 136 each add cycle, after the add pulse. If the gate is open, the pulse will appear at output 334 and may be used to actuate any external information storage system desired.

Following the "transfer" pulse a "reset" pulse may be applied on line 140 to one of the inputs of all flip-flops 310 to reset the stages to "0" or "1," as desired. The four flip-flops 310 in each accumulator unit representing a single decimal digit should be reset to the coded zero, which is "0011." By proper positioning of a soldered jumper in the reset circuit the four flip-flops may, therefore, be set either to a "1" or a "0" as required.

In adding two decimal numbers, X and Y, coded in binary excess-3 code, the result Z is $$Z=(X+3)+(Y+3)=(X+Y)+6.$$

Since the result should be $(X+Y)+3$, in order to bring Z back to the proper coded form, +3 must be subtracted from the result, if the sum of X and Y does not exceed ten. To avoid subtraction, the complement of 3 with respect to 16, or 13, may be added to the result. For a sum of two numbers which does exceed ten, a separate correction must be used, due to the behavior of the binary numbers. With four binary numbers, the sixteen possible combinations permit representation of numbers from 0–15. If $X+Y\geqslant 10$ the sum $(X+Y)+6$ will exceed 15 in the binary system, causing a binary sixteen to be carried over into the next decimal position where it appears as a decimal ten. The four binary numbers which remain in the Z position are zeros for $X+Y=10$ and then increase in a manner which represents the right hand digit of the sum exactly for sums larger than ten. Since 6 was lost in the carry, $(X+Y)+6$ becomes $(X+Y)$, and +3 must be added to Z to bring the code back to the proper form.

The carry between decimal digits, therefore, is the determining factor for the correction factor which is to be applied to the sum after each addition in order to maintain the proper code for the sum. If there is no carry, three is to be subtracted (by addition of binary 13) while if there is a carry, three is to be added.

Referring now to Fig. 2, the inputs for N2 and C2 may be derived from the four stages to accomplish the addition or subtraction of three heretofore described. The carry which results from this addition should not be carried to the next decimal digit position but should be used only in the digit which is being corrected. In binary notation, this amounts to adding "1101" if there is no carry, or adding "0011" if there is a carry. To provide the "1" input to N2 of unit 1, the N2 lead is wired directly to the B+ voltage, so N2 is always "high." For the unit 2, which may receive "1" or "0," the carry output $C1_0$ from adder unit 4 is connected back to the N2 lead, so that for a carry (0011), N2 will be "high," representing binary "1." For units 3 and 4, the N2 leads should receive the same input, "low" for carry and "high" for no carry. The second output lead of pair 318 of each adder unit, opposite in polarity of signal from the output lead $C1_0$, may be utilized to deliver the proper input to the N2 leads of units 3, 4, since it is "low" for a carry signal. The carry outputs $C1_0$ and $C2_0$ from each unit are connected to the next successive unit as illustrated. Since each group of four units represents only one decimal digit, provision is made for a carry from $C1_0$ of unit 4 to input lead C1 of unit 1 of a second group of four units representing the next most significant decimal digit.

It is obvious that for pure binary addition, pairs 322, 323, 324, and 325 and their associated diode matrices, which perform the excess −3 correction, would not be required, but only pairs 300, 301 to receive the input number and carry, flip-flop 310, the storage device, pair 313, and gate 327 would be necessary to form the basic added unit.

What is claimed is:

1. An adder unit comprising: a plurality of bistable devices each provided with a pair of output leads which assume different electrical states and an input lead for receiving signals to reverse the electrical states of said output leads; a first diode matrix connected to the output leads of a first and a second of said devices; a bistable storage element provided with a pair of output leads which assume different electrical states and input leads for receiving signals to reverse the electrical states of said output leads; the input leads of a third and a fourth device being connected to said matrix to derive inputs therefrom; a second diode matrix connected to the output leads of said storage element and said fourth device; a gating circuit provided with an input lead, an enabling lead coupled to said second matrix, and an output lead coupled to one input of said storage device, said gating input lead being connected to receive an electrical control signal to direct the addition process.

2. An adder unit comprising: a plurality of bistable devices each provided with a pair of output leads which assume different electrical states and an input lead for receiving signals to reverse the electrical states of said output leads; a first diode matrix connecting the pairs of output leads of first and second of said devices; a third of said devices having its input lead connected to said matrix for delivering first and third output signals at its output leads; a fourth of said devices having its input lead connected to said matrix for deriving a signal therefrom; a storage element provided with a first output lead which assumes a potential indicative of the electrical state thereof, a pair of output leads which assume opposite electrical states, and input leads for receiving signals to reverse the electrical state of said pair of output leads; a second diode matrix connected to the output leads of said storage element and said fourth device; a fifth of said devices having its input lead connected to said second matrix for deriving a signal therefrom; a third diode matrix connected to the output leads of a sixth and a seventh of said devices and to the input lead of an eighth of said devices; a fourth diode matrix connected to the output leads of said fourth, fifth and eighth devices; gating circuit means for selectively blocking control pulses and provided with an input lead, an enabling lead coupled to said fourth matrix, and an output lead coupled to one input of said storage element; and an output lead coupled to said third and fourth matrices for deriving a second output signal therefrom.

3. A coded decimal adder group for adding four digit binary numbers comprising: four adder units as described in claim 2; means connecting said second output signals from said first, second, and third units to the input leads of respective seventh devices of the second, third, and fourth units; means connecting said first output signal of said fourth unit to the input lead of the sixth device of said second unit; a source of fixed potential corresponding to one binary number; means connecting the input lead of said sixth device of the first unit to said source; means coupling said first output signals of said first, second and third units to the input leads of respective second devices in the second, third and fourth units; and means coupling said third output signals of said fourth unit to the input leads of respective sixth devices in said third and fourth units.

4. An adder circuit comprising a plurality of the adder groups according to claim 3 arranged in parallel, each group corresponding to one decimal digit of the numbers to be added, means for delivering number input signals to the four number inputs of each adder group, means connecting the first output of the fourth unit of each group to the second input of the first unit of the group corresponding to the next most significant digit of said number, said timed pulses being applied substantially simultaneously to each of said adder groups only after said input number and carry signals have been received.

5. In a device for deriving the sum of three quantities represented by groups and sub-groups of potentials, each group of which is representative of the binary value of a different one of said quantities, and each sub-group of which is representative of the binary value of one digit of one of said quantities, including a series of interconnected electrical circuit stages each arranged to receive respective potentials from said sub-group corresponding to the binary representation of a digit, an improved adder stage comprising a multivibrator having two stable conditions, said conditions representing binary one and zero, and representing a number stored therein, signal means for triggering said multivibrator from one stable condition to the other stable condition, a gate circuit having operative and inoperative conditions and interposed electrically between said multivibrator and said signal means for blocking said triggering signal when said gate is in the inoperative or closed position, and a network electrically connected to said gate circuit for rendering said circuit operative or inoperative in response to the condition of said multivibrator and the said input quantities, said network including first, second, third, and fourth input devices each having a pair of output leads of opposite electrical state and an input lead for receiving electrical signals to change the states of said output leads, first, second, third, and fourth comparator matrices comprising said output leads arranged as input circuits to said matrices, a plurality of conductors coupled thereto, and matrix output leads, the input circuits of said first matrix being connected to receive a potential representative of a number from a respective sub-group and another potential representative of a carry signal from the preceding stage, the input circuits of the second of said matrices being connected to the output of said first matrix and to said multivibrator, the input to said third matrix being connected to receive a pair of potentials representative of a correction factor in binary coded system, the input circuit of said fourth matrix being connected to the outputs of said second and third matrices, said gate circuit being connected to the output circuit of said fourth matrix, a first diode comparator unit connecting said first and second matrices for providing a first carry signal output, a second diode comparator unit connecting said second and third matrices and a third diode comparator unit connecting said third and fourth matrices for providing a second carry signal to the next successive stage.

6. A coded decimal adder group for adding two decimal digits coded in four-digit binary form comprising: four adder units as described in claim 2 arranged in parallel to receive electrical signals corresponding to the binary digits of one of said numbers at respective first bistable device input leads and having respective storage elements arranged in electrical states corresponding to the digits of the other of said numbers; conductors coupling one output lead from the third bistable device in the first, second, and third units to the input leads of respective second devices in the second, third, and fourth devices to provide a number interstage carry signal; a first conductor coupling one output lead from the third device in the fourth unit to the input lead of the sixth device of said second unit to deliver a signal corresponding to a decimal carry signal thereto; second and third conductors coupling the other output lead from the third device in the fourth unit to the input leads of respective sixth devices in the third and fourth units to provide a number correction factor therefor; means for deriving a signal corresponding to a selected binary number and coupling said signal to the input lead of the sixth device of the first unit to provide a constant number correction factor in said first unit, whereby signals corresponding to the digits of the sum of said added digits are established on respective first output leads of said storage elements, and a signal corresponding to a necessary decimal carry may be established on said first conductor.

7. Means for obtaining the sum of five binary numbers, each binary number being represented by the presence of or absence of a selected electrical signal at a given time, comprising: a bistable storage element provided with a pair of outputs and actuable responsive to one of said number signals; means responsive only to a coincidence of signals corresponding to second and third numbers for providing first and second intermediate binary signals; means responsive only to a coincidence of said first intermediate signal and a selected signal on a first output of said storage element for providing third and fourth intermediate binary signals; means responsive to the occurrence of only one of said second and fourth intermediate signals for providing first and third output signals; means responsive only to a coincidence of signals corresponding to fourth and fifth numbers for providing fifth and sixth intermediate binary signals; means responsive only to a coincidence of said third and fifth intermediate signals for providing seventh and eighth intermediate binary signals; means responsive to occurrence of only one of said sixth and seventh intermediate signals for providing a second output signal; and means for actuating said storage element responsive to occurrence of said eighth intermediate signal.

References Cited in the file of this patent

UNITED STATES PATENTS

| | | |
|---|---|---|
| 2,404,047 | Flory | July 16, 1946 |
| 2,428,811 | Rajchman | Oct. 14, 1947 |
| 2,428,812 | Rajchman | Oct. 14, 1947 |
| 2,473,444 | Rajchman | June 14, 1949 |
| 2,570,716 | Rochester | Oct. 9, 1951 |
| 2,590,950 | Eckert, Jr. et al. | Apr. 1, 1952 |
| 2,609,143 | Stibitz | Sept. 2, 1952 |